US010938604B2

(12) United States Patent
Azenkot et al.

(10) Patent No.: US 10,938,604 B2
(45) Date of Patent: Mar. 2, 2021

(54) RECEIVER SUPPORTING MULTIPLE DATA RATES WITH FAST EQUALIZATION

(71) Applicant: MACOM Technology Solutions Holdings, Inc., Lowell, MA (US)

(72) Inventors: Yehuda Azenkot, San Jose, CA (US); Georgios Takos, Mountian View, CA (US); Bart R Zeydel, Fair Oaks, CA (US)

(73) Assignee: Macom Technology Solutions Holdings, Inc, Lowell, MA (US)

( * ) Notice: Subject to any disclaimer, the term of this patent is extended or adjusted under 35 U.S.C. 154(b) by 0 days.

(21) Appl. No.: 16/825,475

(22) Filed: Mar. 20, 2020

(65) Prior Publication Data

US 2020/0304352 A1 Sep. 24, 2020

Related U.S. Application Data

(60) Provisional application No. 62/821,348, filed on Mar. 20, 2019.

(51) Int. Cl.
*H04B 1/16* (2006.01)
*H04L 25/03* (2006.01)

(52) U.S. Cl.
CPC .............................. *H04L 25/03063* (2013.01)

(58) Field of Classification Search
CPC ..... H04L 25/03057; H04L 2025/03681; H04L 27/06; H04L 27/2631; H04B 1/16
See application file for complete search history.

(56) References Cited

U.S. PATENT DOCUMENTS

2006/0031274 A1* 2/2006 Haddadin .......... H03H 17/0664
708/300
2007/0127600 A1* 6/2007 Sato ...................... H04L 7/0054
375/327

* cited by examiner

*Primary Examiner* — David S Huang

(57) ABSTRACT

A system for receiving signals transmitted via serial links includes an analog-to-digital converter configured to sample the first analog signal at a first rate, and generate a first digital input signal having a second data rate. The system also includes a decimator coupled to an output of the equalizer and configured to downsample the first equalized signal to a decimated signal having the first data rate. The system further includes a fast equalization module for determining output data corresponding to the communications signal. The fast equalization module includes a filter to access an output of the equalizer, a second slicer module to access an output of the filter and produce a data output corresponding to the communications signal, a lookup table to provide filtering coefficients to the filter, and a coefficient improvement module to improve the coefficients based on an error signal from the filter.

20 Claims, 4 Drawing Sheets

RECEIVER SUPPORTING MULTIPLE DATA RATES WITH FAST EQUALIZATION

RELATED APPLICATION(S)

This Application claims priority to U.S. Provisional Application 62/821,348, "Digital Interpolation for Jitter Migration," to Azenkot et al., filed Mar. 20, 2019, which is hereby incorporated herein by reference in its entirety. This Application is related to U.S. Pat. No. 10,411,918, "Receiver Supporting Multiple Data Rates," to Azenkot et al., which is hereby incorporated herein by reference in its entirety. This Application is related to U.S. Pat. No. 10,404,496, "Mitigating Interaction Between Adaptive Equalization and Timing Recovery in Multi-Rate Receiver," to Azenkot et al., which is hereby incorporated herein by reference in its entirety.

FIELD OF INVENTION

Embodiments of the present invention relate to the field of communications signal processing. More specifically, embodiments of the present invention relate to systems and methods for receivers supporting multiple data rates with fast equalization.

BACKGROUND

A typical communications link may include a PAM-4 (Pulse Amplitude Modulation with 4 levels) transmitter and receiver in conjunction with an optical transmitter and/or receiver. Frequently, an optical transmitter drives an MZI (Mach-Zehnder-Interferometer) optical modulator. A received optical signal is usually converted to electrical signals via a photo detector.

In one example, the data rate can be 53.125 GBaud, which supports about 100 Gbps for PAM-4 modulation.

Generally, an ADC (Analog to Digital Converter) samples the received signal at full rate of 53.125 GHz. Then an equalizer compensates for some distortions that the received signal incurred through the channel. Then a slicer makes decisions on the PAM-4 symbols. In some systems, a receiver may be required to support multiple data rates, such as a full data rate (e.g., 100 Gbps) as well as a half (50 Gbps) and/or a quarter data rate (25 Gbps). Herein, the maximum data rate that the multi-rate receiver is capable of supporting is referred as the full rate, and a half rate refers to a data rate that is half of the full rate, etc. It is desirable that such a receiver can be implemented with minimal modifications from a receiver that only supports a single rate (or the full rate).

Receivers of digital data typically have timing recovery loop, or CDR (clock data recovery) functions that extract timing information from the serial data stream to allow the receiver to sample the data at the right time. The timing recovery loop may include a phase detector (PD), a loop filter (LF) and phase interpolator (PI) and/or a VCO. The phase detector may be based on a Mueller-Muller algorithm where the received symbols are sampled at one sample/symbol. The phase interpolator outputs a clock which is at the full baud rate of 53.125 GHz, in some embodiments. The phase interpolator clock drives the ADC that samples the input analog signal at the rate of full baud rate.

The timing recovery should track and remove any jitter that the received data incurred. However, the timing recovery can only track jitter with frequencies below the bandwidth of the timing recovery loop. Any jitter at frequencies above the timing recovery bandwidth can have a detrimental effect on the performance of the receiver especially in high data rates. Reducing the jitter of the analog components is a challenging issue.

SUMMARY OF THE INVENTION

Therefore, what is needed are systems and methods for receivers supporting multiple data rates with fast equalization. What is additionally needed are systems and methods for receivers supporting multiple data rates with fast equalization that can overcome the effects of high frequency jitter which cannot be tracked by a timing recovery subsystem. There is a further need for systems and methods for receivers supporting multiple data rates with fast equalization that are compatible and complementary with existing systems and methods of clock recovery in communication receivers.

In accordance with an embodiment of the present invention, a system for receiving signals transmitted via serial links includes an analog-to-digital converter (ADC) configured to receive a first analog signal having a first data rate, sample the first analog signal at a first rate, and generate a first digital input signal having a second data rate that is M times of the first data rate, wherein M is an integer greater than 2. The system also includes an equalizer coupled to an output of the ADC and configured to generate a first equalized signal having the second data rate, a decimator coupled to an output of the equalizer and configured to downsample the first equalized signal to a decimated signal having the first data rate. The system further includes a first slicer coupled to an output of the decimator and a timing recovery module coupled to the output of the decimator and an output of the slicer, a fast equalization module for determining output data corresponding to the communications signal. The fast equalization module includes a filter to access an output of the equalizer, a second slicer module to access an output of the filter and produce a data output corresponding to the communications signal, a lookup table to provide filtering coefficients to the filter, and a coefficient improvement module to improve the coefficients based on an error signal from the filer, wherein the coefficient improvement module is configured to update the coefficients in the lookup table.

In accordance with a method embodiment of the present invention, a method of processing received signals of different data rates includes receiving a first analog signal having a first data rate, converting the first analog signal to a first digital input signal by using a clock signal having a first rate during analog-to-digital conversion, performing equalization on the first digital input signal to generate a first equalized signal, decimating the first equalized signal by M to generate a decimated signal, wherein M is an integer greater than 1, filtering the decimated signal based on coefficients stored in a lookup table, and performing timing recovery on the decimated signal to obtain the clock signal having the first rate.

In accordance with another embodiment of the present invention, a receiver operable to process received signals of different data rates includes an analog-to-digital converter (ADC) configured to convert a first analog signal having a first data rate to a first digital input signal by using a first rate for sampling, and convert a second analog signal having a second data rate to a second digital input signal by using the first rate for sampling. The second data rate is M times of the first data rate, wherein M is an integer greater than 1. The receiver also includes an equalizer coupled to an output of the ADC and configured to perform equalization on the first digital input signal to generate a first equalized signal by using a full operation rate of the equalizer, and perform equalization on the second digital input signal to generate a second equalized signal by using the full operation rate of the equalizer. The receiver further includes a decimator coupled to an output of the equalizer, a timing recovery module coupled to an output of the decimator, and a fast equalization module configured to remove jitter at frequencies above the timing recovery bandwidth.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings may not be drawn to scale.

DETAILED DESCRIPTION

Reference will now be made in detail to various embodiments of the invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations performed by electronic devices and/or circuits. These descriptions and representations are the means used by those skilled in the electronic arts to most effectively convey the substance of their work to others skilled in the art. In the present application, a procedure, a method, logic block, process, or the like, is conceived to be a self-consistent sequence of operations or instructions leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing terms such as "filtering," "slicing," "improving," "updating," "accessing," or the like, refer to actions and processes (e.g., method 400 of FIG. 4) of electronic devices and/or electronic circuits, including, for example, integrated circuits.

Receiver Supporting Multiple Data Rates With Fast Equalization

Figure 1:
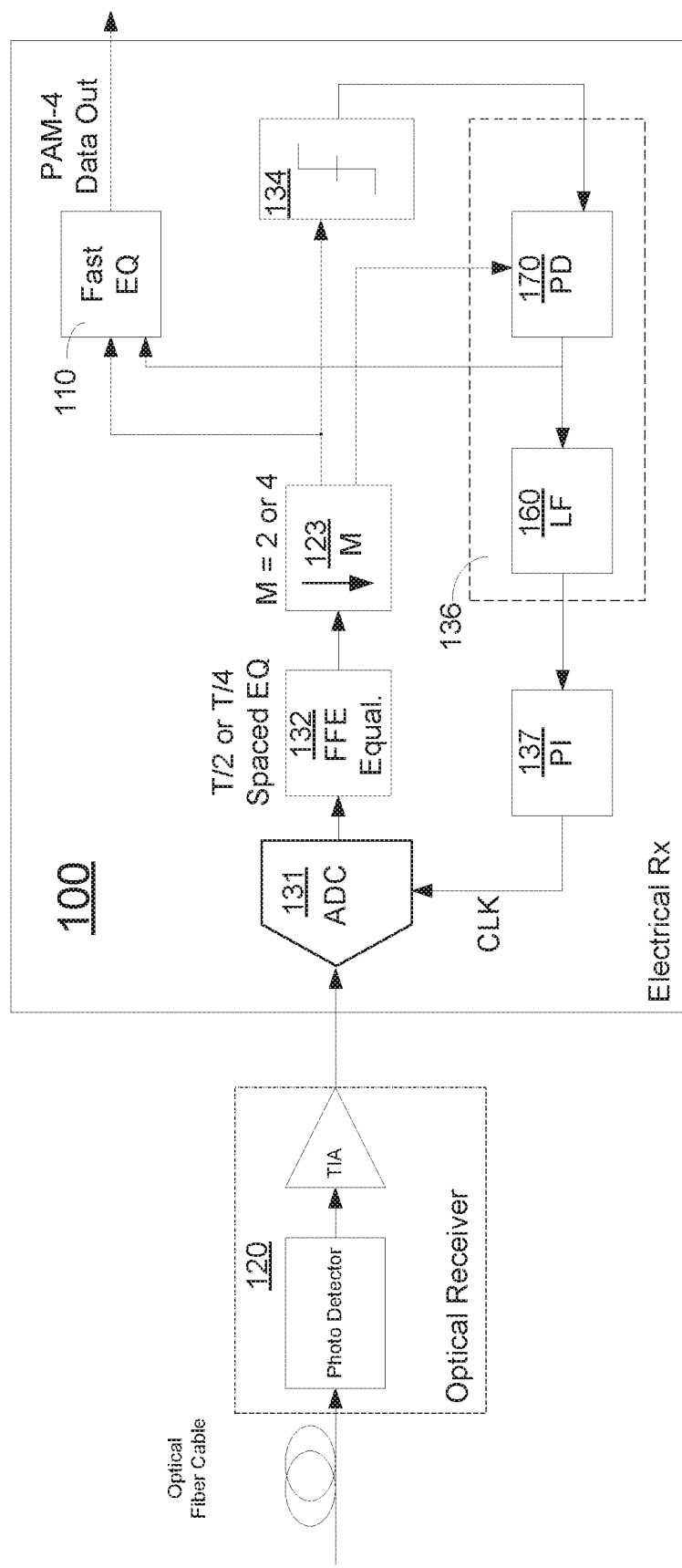
FIG. 1 illustrates an exemplary block diagram of a receiving system supporting multiple data rates with fast equalization, in accordance with embodiments of the present invention.

FIG. 1 illustrates an exemplary block diagram of a receiving system supporting multiple data rates with fast equalization 100, in accordance with embodiments of the present invention. System 100 is typically coupled to an optical receiver to receive electrical signals corresponding to optical signals transmitted over, for example, an optical fiber. It is appreciated, however, that embodiments in accordance with the present invention are well suited to serial communications transmitted over any medium, including, for example, wire communications and/or Radio Frequency (RF) communications.

Receiver system 100 typically includes an equalizer 132 disposed upstream of a decimator 123 in accordance with an embodiment of the present disclosure. For example, the receiver 100 can be configured to support a full (maximum) data rate of 100 Gbps, a half data rate of 50 Gbps and a quarter data rate of 25 Gbps. However, it will be appreciated that the present disclosure is not limited to any specific data rates or any specific number of rates that a single receiver is configured for. Further a data rate referred herein may correspond to any suitable data rate unit, such as a bit-rate, a baud rate, a symbol rate, a sample rate, etc.

In a simplified form, the receiver system 100 is coupled to an optical receiver 120. Data of different transmission rates can propagate from the optical receiver 120 to the multiple data-rate electrical receiver 100. An optical transmitter (not shown) may include a driver and a Mach-Zehnder interferometer (MZI) and operate to receive data modulated according to PAM-4. The optical receiver 120 may include a photo detector and a transimpedance amplifier (TIA) and operates to receive data from an optical fiber cable. The electrical receiver 100 receives the signals from the optical receiver 120 and performs data and clock recovery.

The electrical receiver 100 includes an analog-to-digital converter (ADC) 131, a feed-forward equalizer (FFE) 132, a slicer 134, a timing recovery (TR) module 136, and a phase interpolator (PI) 137. The timing recovery module 136 may include a Mueller-Muller-based phase detector (PD) 170, and a loop filter (LF) 160, in some embodiments. The slicer 134 outputs the recovered and demodulated data based on appropriate constellation thresholds. Both the slicer input and the output are provided to the timing recovery module (TR) 136 for locating an optimal sampling phase. The timing recovery module 136 may include a phase detector 170, a loop filter 160, and/or a VCO (not shown). The timing recovery module 136 and the phase interpolator 137 in combination with the clock feedback path (CLK) to the ADC 131 form a timing recovery loop. To support a data rate less than the full rate, for example, that is only one half or one quarter of the full rate, or otherwise a fraction of, the full or maximum rate, the electric receiver 100 includes a decimator 123 disposed downstream of the FFE 132.

Each component in the system 100 can be implemented in any suitable manner that is well known in the art without departing from the scope of the present disclosure. For example, the FFE 132 may be replaced with a decision-feedback equalizer (DFE) which also includes a feedback filter as the FFE 132.

More specifically, the FFE 132 is coupled to the output of the ADC 131 and the decimator 123 is coupled to the output of the FFE 132. The output of the decimator 123 is supplied to the slicer 134 as well as to the timing recovery module 136 and further to the phase interpolator 137. The ADC 131 operates in its full operation rate regardless of the data rate of the received signal. The decimator 123 operates to decimate the signal by M (M>1) if the received signal has a lower data rate than the full data rate. If the received signal has the full data rate, the decimator 123 is disabled or by-passed.

For example, upon receiving a half rate signal with the symbol time period being T, the ADC 131 is clocked by a full rate clock and oversamples the analog data in the full sampling rate. The FFE 132 receives the digital input signal output from the ADC 131 and generates an equalized signal. The FFE 132 also operates in its full operation rate and samples the data in its full sample rate. For example, the FFE operates in a fractionally-spaced equalizer. Therefore, the samples in the equalized signal are T/2-spaced (and T/4-spaced in the case of quarter rate). The equalizer output is then decimated by 2 (M=2) to produce a half rate signal with the sample period being T-spaced.

The decimated signal is then supplied to the slicer 134 to make slicer decisions on the symbols based on the proper modulation scheme, and also supplied to the timing recovery module 136 for sampling phase recovery and further to the phase interpolate 137 to output a recovered clock (CLK) having the full clock rate. The recovered clock is fed back to drive the ADC 131 that sample the input analog signal at the ADC's full operation rate. For example, the baud rate of the full data rate is 53.125 GHz, and correspondingly the recovered clock frequency is also 53.125 GHz.

Hence in a half-rate operation mode of the receiver, the ADC 131, the FFE 132 and the phase interpolator 137 all operate at their full operation rates, whereas the slicer and the timing recovery module both operate at their half operation rates. Similarly, in a quarter-rate operation mode of the receiver, the ADC 131, the FFE 132, and the phase interpolator 137 all operate at the full operation rates, whereas the slicer and the timing recovery module both operate at the quarter operation rates. On the other hand, if the received signal has a full data rate, all the components 131-237 operate in their full operation rates. It will be appreciated the various components 131-237 may have the same or the different full operation rates.

Because the equalizer is disposed upstream of the decimator, it can effectively perform low pass filtering functions during an equalization process, there is no extra low pass filter needed to remove the high frequency noise before decimation, which advantageously simplifies the circuitry design and reduces the operational power consumption of the receiver. As a result, the latency associated with using an extra LPF is advantageously eliminated.

It will be appreciated that the electrical receiver 100 may include control logic that can select the proper operation modes for each component therein based on the detected data rate, including enabling or disabling the decimator and choosing the proper M for the decimator. The electrical receiver 100 may also include a wide range of other components that are well known in the art.

In accordance with embodiments of the present invention, a fast equalizer 110 is added to the blocks previously described. In general, fast equalizer 110 implements a data-based filter based on coefficients stored in a lookup table. Beneficially, the coefficients are updated based on an error signal from the filter. Accordingly, the received signal is sampled at improved timing locations. Advantageously, the effect of clock jitter is reduced beyond a timing recovery bandwidth of a timing recovery loop, enabling a desirable reduced bit error rate in the received signal.

Figure 2:
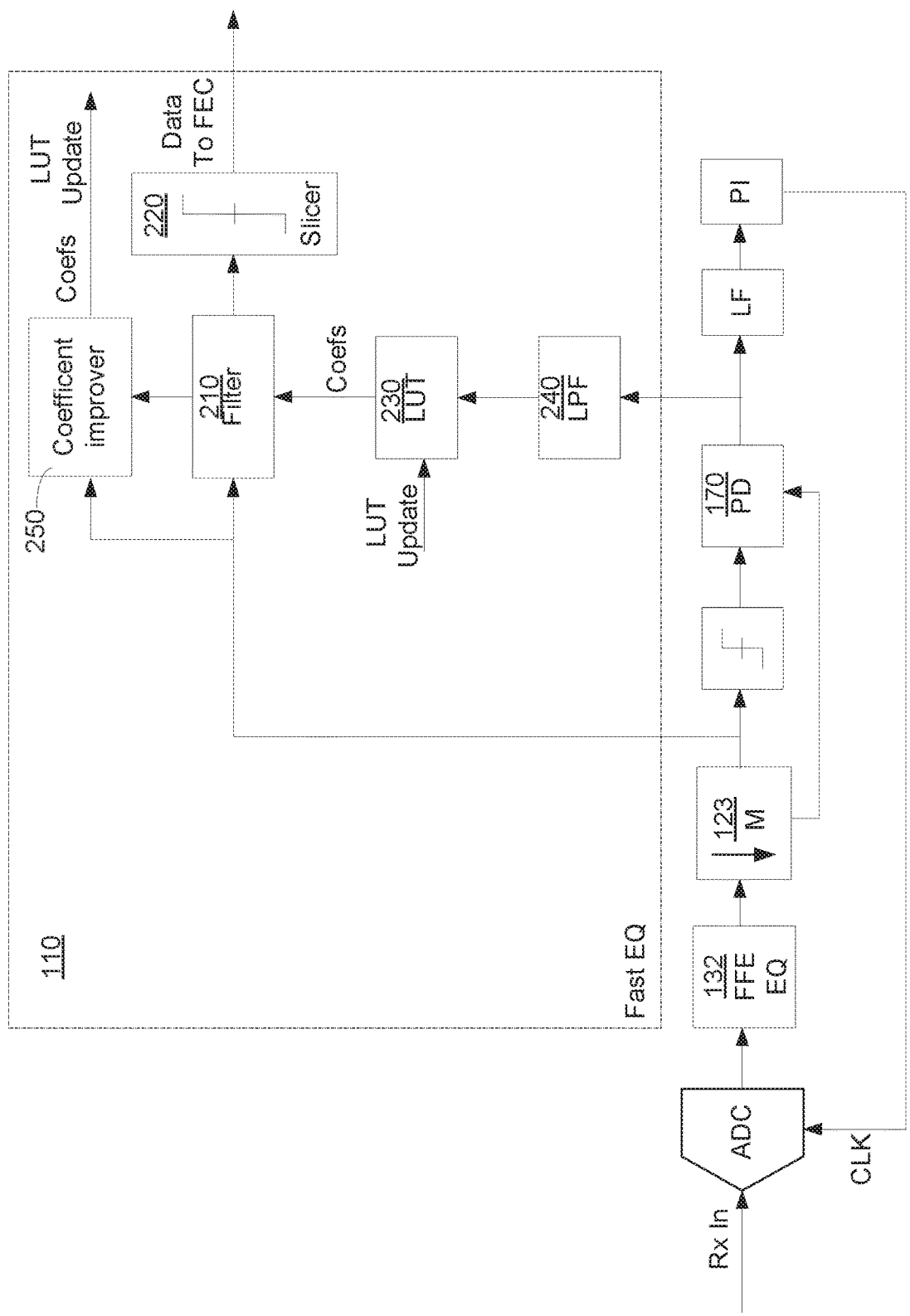
FIG. 2 illustrates a block schematic of an exemplary Fast Equalizer, in accordance with embodiments of the present invention.

FIG. 2 illustrates a block schematic of an exemplary Fast Equalizer 110, in accordance with embodiments of the present invention.

The equalizer (EQ) 120 outputs 64 samples in parallel which are further processed by the filter 210 of the fast EQ 110. In contrast to loop filter 160 (FIG. 1), filter 210 is a data filter. The output of the filter 210 is passed through a PAM-4 slicer 220 outputting the decisions of the data to a FEC (forward error correction) decoder (not shown). The filter 210 may be a finite impulse response (FIR)-based filter utilizing 5 coefficients. In general, the filter 210 interpolates the signal at phase offset based on 5 samples. The filter coefficients are retrieved from the LUT (look-up table) 230 based on the averaged phase offset of the 64 data samples. The LUT 230 has, for example, 128 sets of coefficients, where each set has 5 coefficients. The coefficients are a function of phase offset. The LUT 230 index or address is generated based on the average of 64 phase offsets obtained from the PD (phase detector) 170. The averaging of the 64 PD outputs is done via a low-pass filer (LPF) 240 that can be implemented via a simple finite impulse response (FIR) filter. The samples, e.g., 64 samples, obtained from the EQ are processed by the coefficient improver module 250 to generate a better equalized-coefficients which are written back into the LUT 230 at the appropriate LUT 230 address for future use.

Relation 1, below, is an exemplary least mean square process, for example, implemented in coefficient improver 250, in accordance with embodiments of the present invention.

$$C_{k+1}(i) = C_k(i) + \mu \cdot \sum_{i=1}^{64} e_k^j \cdot r_k^j(i), i = 1, \ldots, 5 \qquad \text{(Relation 1)}$$

For the time index k, 64 values of the error, $e_k^j$, j=1, ..., 64, are calculated for the same set of 5 coefficients $C_k(i)$, i=1, ..., 5, and the appropriate samples of the input $r_k$. Then, the 64 errors are multiplied by the appropriate input samples, r, and summed. Then, after multiplying by the step parameter, $\mu$, the 5 corrections to the 5 coefficients are added to obtain the updated 5 coefficients, $C_{k+1}(i)$ for i=1, ..., 5.

Table 1, below, illustrates exemplary values of 5-tap FIR coefficients, in accordance with embodiments of the present invention.

TABLE 1

| Default | 0 | 0 | 1 | 0 | 0 |
|---|---|---|---|---|---|
| Exemplary | −0.01 | 0.062 | 1 | −0.06 | 0.01 |

The LMS duration may extend to more than one cycle, e.g., for 5 cycles.

In full-rate mode, e.g., when decimator 123 (FIG. 1) is set to M=1, the equalizer 132 outputs nominally 64 samples in parallel which are further processed by the filer 210 of the fast equalizer 110. However, in half-rate mode, e.g., when the decimator is set to M=2, there are only 32 samples in parallel processed by the filter 210. The 32 samples output are also processed by the coefficient improver 250 to generate a better equalized-coefficients which are written back into the LUT 230 for the appropriate LUT 230 address. In a half rate mode, where the decimator is set to M=2, the filter 210 processes 32 samples, then 32 samples are sliced by the slicer 220. Also, the timing recovery loop phase detector 170 processes 32 samples. So, the LUT 230 input index is based on averaged 32 samples. In a quarter rate mode, where the decimator is set to M=4, the filter 210 processes 16 samples, then 16 samples are processed by the slicer 220.

Figure 3:
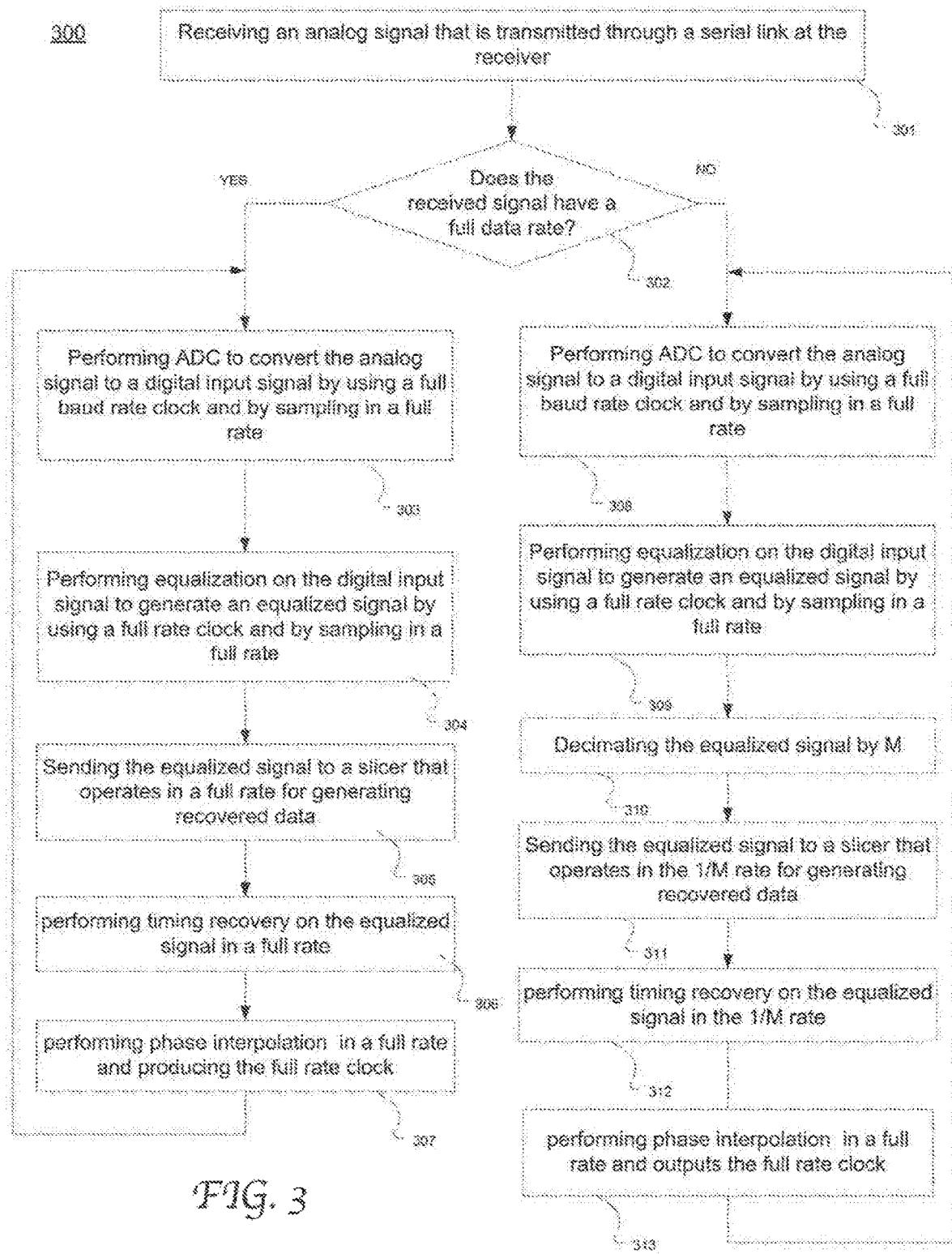
FIG. 3 is a flow chart depicting an exemplary process of data and clock recovery at a multiple data-rate receiver, in accordance with embodiments of the present invention.

FIG. 3 is a flow chart depicting an exemplary process 300 of data and clock recovery at a multiple data-rate receiver, in accordance with embodiments of the present invention.

Process 300 may be performed by the electrical receiver configured as 100 in FIG. 2 for example, but may also be performed by any other suitable hardware logic, software logic, firmware logic, or a combination thereof.

At 301, an input analog signal that is transmitted through a serial link is received at the receiver. At 302, it is determined whether the signal has the full data rate. If yes, at 303 analog-to-digital conversion is performed to convert the input analog signal into a digital input signal by using a full baud rate clock, including sampling the input signal in a full sampling rate. The full sampling rate may be the same as the clock rate in some embodiments, but may also be multiple times of the clock rate in some other embodiments, e.g., by using a multi-channel ADC.

At 304, an equalization process is performed to generate an equalized signal by using the full rate clock and by sampling the digital input signal in a full sampling rate. At 305, the equalized signal is sent to a slicer that operates in a full rate and outputs recovered data. At 306, timing recovery is performed on the equalized signal in a full operation rate of a timing recovery module to produce the correct sampling phase. At 307, phase interpolation is performed in a full operation rate of the phase interpolator to produce the recovered clock which is supplied back for clocking the ADC. Thus, the foregoing loop 303-307 is repeated.

On the other hand, if the received analog signal has a data rate less than the full rate (as determined at 302), namely 1/M rate, analog-to-digital conversion is still performed by using a full rate clock, including sampling the input signal in a full sampling rate. At 309, an equalization process is performed to generate an equalized signal by using the full rate clock and by sampling the digital input signal in a full sampling rate of the equalizer. The equalizer and the ADC may have the same full sampling rate. At 310, the equalized signal is decimated or down-sampled by M to generate a decimated signal.

At 311, the decimated signal is sent to a slicer that operates in 1/M of its full operation rate and outputs recovered data. At 312, timing recovery is performed on the decimated signal in 1/M of the full operation rate of the timing recovery module to produce the correct sampling phase. At 313, phase interpolation is performed in a full operation rate of the phase interpolator to produce the recovered clock which is supplied back for analog-to-digital conversion. Thus, the foregoing loop 308-313 is repeated.

Figure 4:
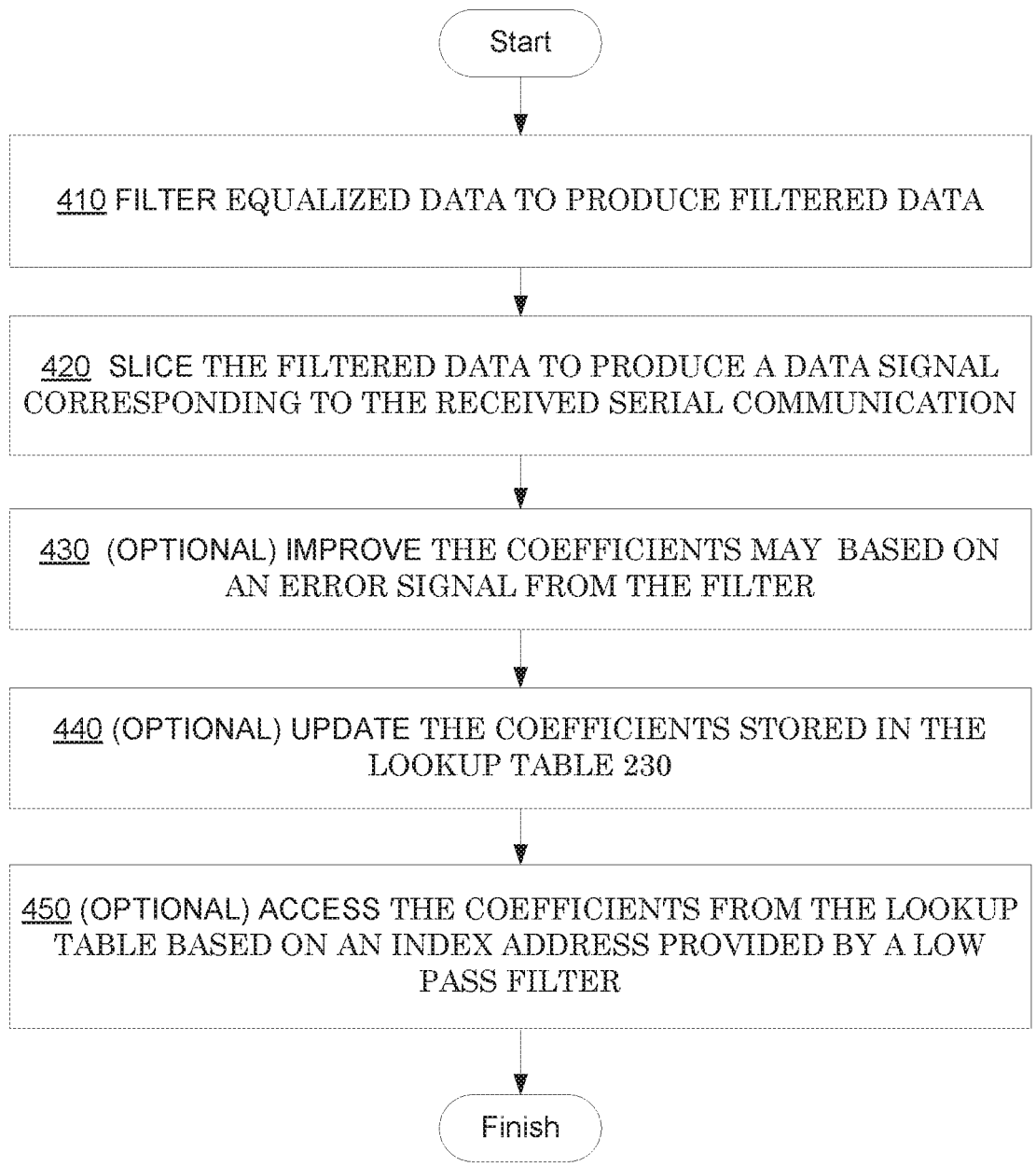
FIG. 4 illustrates a method of fast equalization for mitigating jitter in clock signals recovered from received serial commutation, in accordance with embodiments of the present invention.

FIG. 4 illustrates a method 400 of fast equalization for mitigating jitter in clock signals recovered from received serial communication, in accordance with embodiments of the present invention. In accordance with embodiments of the present invention, the received serial communications may be at a rate less than a full rate, e.g., one half and/or one quarter of the full rate, of the maximum reception rate of the receiver.

In 410, equalized data is filtered to produce filtered data. The filtering may be performed, for example, by filter 210 of FIG. 2. The filtering may be based on coefficients accessed from a lookup table, e.g., based on coefficients accessed from lookup table 230 of FIG. 2. In 420, the filtered data is sliced to produce a data signal corresponding to the received serial communication. The slicing may be performed, for example, by slicer 220 of FIG. 2.

In optional 430, the coefficients may be improved based on an error signal from the filter, e.g., filter 210 of FIG. 2. The improvement may be performed by coefficient improver 250, for example. Coefficient improver 250 may implement a least mean square process, for example. In optional 440, the coefficients stored in the lookup table, e.g., lookup table 230 of FIG. 2, may be updated. In optional 450, the coefficients from the lookup table, e.g., lookup table 230 of FIG. 2, may be accessed based on an index address provided by a low pass filter, e.g., low pass filter 240.

Concepts disclosed herein include:

Concept 1. A system for receiving signals transmitted via serial links, comprising:
    an analog-to-digital converter (ADC) configured to:
        receive a first analog signal having a first data rate;
        sample said first analog signal at a first rate; and
        generate a first digital input signal having a second data rate that is M times of said first data rate, wherein M is an integer greater than 2;
    an equalizer coupled to an output of said ADC and configured to generate a first equalized signal having said second data rate;
    a decimator coupled to an output of said equalizer and configured to: downsample said first equalized signal to a decimated signal having said first data rate;
    a first slicer coupled to an output of said decimator; and
    a timing recovery module coupled to said output of said decimator and an output of said slicer;
    a fast equalization module for determining output data corresponding to said communications signal, said fast equalization module comprising:
        a filter to access an output of said equalizer;
        a second slicer module to access an output of said filter and produce a data output corresponding to said communications signal;
        a lookup table to provide filtering coefficients to said filter; and
        a coefficient improvement module to improve said coefficients based on an error signal from said filer, wherein
        said coefficient improvement module is configured to update said coefficients in said lookup table.

Concept 2. The system of concept 1, wherein said timing recovery module and said slicer are configured to operate at 1/M of respective full operation rates responsive to said first analog signal.

Concept 3. The system of concept 2 further comprising a phase interpolator coupled to an output of said timing recovery module and configured to output a clock signal for sampling said first analog signal at said first rate.

Concept 4. The system of concept 3, wherein said ADC is further configured to: receive a second analog signal transmitted in said second data rate; sample said second analog signal in said first rate; and generate a second digital input signal, wherein said equalizer is further configured to: sample said second digital input signal in said first rate; and generate a second equalized signal having said second data rate, wherein said decimator is further configured to be deactivated responsive to said second analog signal.

Concept 5. The system of concept 4, wherein said slicer and said timing recovery module are further configured to operate at said respective full operation rates thereof responsive to said second analog signal.

Concept 6. The system of concept 5, wherein said phase interpolator is further configured to operate in a full operation rate and generate said clock signal in said first rate responsive to said second analog signal.

Concept 7. The system of concept 1, wherein said equalizer comprises a feed-forward equalizer (FFE) configured to operate in a fractionally-spaced mode, and wherein further said timing recovery module comprises a phase interpolator, a phase detector, and a low pass filter.

Concept 8. The device of concept 1, wherein no low pass filter is coupled between said equalizer and said decimator.

Concept 9. A method of processing received signals of different data rates, said method comprising:
  receiving a first analog signal having a first data rate;
  converting said first analog signal to a first digital input signal by using a clock signal having a first rate during analog-to-digital conversion;
  performing equalization on said first digital input signal to generate a first equalized signal;
  decimating said first equalized signal by M to generate a decimated signal, wherein M is an integer greater than 1;
  filtering the decimated signal based on coefficients stored in a lookup table; and
  performing timing recovery on said decimated signal to obtain said clock signal having said first rate.

Concept 10. The method of concept 9, wherein said timing recovery is performed in 1/M of a full operation rate of a timing recovery module responsive to said first analog signal.

Concept 11. The method of concept 9, wherein said equalization is performed in a full operation rate of an equalizer responsive to said first analog signal.

Concept 12. The method of concept 11 further comprising: receiving a second analog signal that is transmitted in a second data rate that is M times of said first data rate; converting said second analog signal to a second digital input signal by using said clock signal having said first rate during analog-to-digital conversion; performing equalization in said first full operation rate of said equalizer on said second digital input signal to generate a second equalized signal; performing timing recovery on said second equalized signal without decimating to obtain said clock signal having said first rate.

Concept 13. The method of concept 9, wherein said first equalized signal propagates from an equalizer to a decimator without passing through a low pass filter in between said equalizer and said decimator.

Concept 14. A receiver operable to process received signals of different data rates, said receiver comprising:
  an analog-to-digital converter (ADC) configured to:
    convert a first analog signal having a first data rate to a first digital input signal by using a first rate for sampling; and
    convert a second analog signal having a second data rate to a second digital input signal by using said first rate for sampling,
  wherein said second data rate is M times of said first data rate,
  wherein M is an integer greater than 1;
  an equalizer coupled to an output of said ADC and configured to:
    perform equalization on said first digital input signal to generate a first equalized signal by using a full operation rate of said equalizer; and
    perform equalization on said second digital input signal to generate a second equalized signal by using said full operation rate of said equalizer;
  a decimator coupled to an output of said equalizer;
  a timing recovery module coupled to an output of said decimator; and
  a fast equalization module configured to remove jitter at frequencies above the timing recovery bandwidth.

Concept 15. The receiver of concept 14, wherein said decimator is configured to: decimate said first equalized signal by M; and send a decimated signal to said timing recovery module, and wherein further said decimator is configured to be by-passed responsive to said second equalized signal.

Concept 16. The receiver of concept 14 further comprising a slicer coupled to said output of said decimator and configured to: operate in 1/M of a full operation rate of said slicer responsive to said first analog signal; and operate in said full operation rate of said slicer responsive to said second analog signal.

Concept 17. The receiver of concept 14 further comprising a phase interpolator coupled between said timing recovery module and said ADC, wherein said phase interpolator is configured to generate a clock signal for supply to said ADC in a same rate responsive to said first analog signal and to said second analog signal.

Concept 18. The receiver of concept 14, wherein said timing recovery module is configured to: perform timing recovery in a 1/M of a full operation rate of said timing recovery module responsive to said first analog signal; and perform timing recovery in said full operation rate of said timing recovery module responsive to said second analog signal.

Concept 19. The receiver of concept 14, wherein said equalizer comprises a feed-forward equalizer (FFE) operable to operate in a fractionally-spaced mode.

Concept 20. The receiver of concept 14, wherein no low pass filter is coupled between said equalizer and said decimator.

Embodiments in accordance with the present invention provide systems and methods for receivers supporting multiple data rates with fast equalization. In addition, embodiments in accordance with the present invention provide systems and methods for receivers supporting multiple data rates with fast equalization that can overcome the effects of high frequency jitter which cannot be tracked by a timing recovery subsystem. Further, embodiments in accordance with the present invention provide systems and methods for receivers supporting multiple data rates with fast equalization that are compatible and complementary with existing systems and methods of clock recovery in communication receivers.

Various embodiments of the invention are thus described. While the present invention has been described in particular embodiments, it should be appreciated that the invention should not be construed as limited by such embodiments, but rather construed according to the below claims.

What is claimed is:

1. A system for receiving signals transmitted via serial links, comprising:
  an analog-to-digital converter (ADC) configured to:
    receive a first analog signal having a first data rate;
    sample said first analog signal at a first rate; and generate a first digital input signal having a second data rate that is M times of said first data rate, wherein M is an integer greater than 2;

an equalizer coupled to an output of said ADC and configured to generate a first equalized signal having said second data rate;

a decimator coupled to an output of said equalizer and configured to: downsample said first equalized signal to a decimated signal having said first data rate;

a first slicer coupled to an output of said decimator; and a timing recovery module coupled to said output of said decimator and an output of said slicer;

a fast equalization module for determining output data corresponding to said communications signal, said fast equalization module comprising:
 a filter to access an output of said equalizer;
 a second slicer module to access an output of said filter and produce a data output corresponding to said communications signal;
 a lookup table to provide filtering coefficients to said filter; and
 a coefficient improvement module to improve said coefficients based on an error signal from said filer, wherein
 said coefficient improvement module is configured to update said coefficients in said lookup table.

2. The system of claim 1, wherein said timing recovery module and said slicer are configured to operate at 1/M of respective full operation rates responsive to said first analog signal.

3. The system of claim 2 further comprising a phase interpolator coupled to an output of said timing recovery module and configured to output a clock signal for sampling said first analog signal at said first rate.

4. The system of claim 3, wherein said ADC is further configured to: receive a second analog signal transmitted in said second data rate; sample said second analog signal in said first rate; and generate a second digital input signal, wherein said equalizer is further configured to: sample said second digital input signal in said first rate; and generate a second equalized signal having said second data rate, wherein said decimator is further configured to be deactivated responsive to said second analog signal.

5. The system of claim 4, wherein said slicer and said timing recovery module are further configured to operate at said respective full operation rates thereof responsive to said second analog signal.

6. The system of claim 5, wherein said phase interpolator is further configured to operate in a full operation rate and generate said clock signal in said first rate responsive to said second analog signal.

7. The system of claim 1, wherein said equalizer comprises a feed-forward equalizer (FFE) configured to operate in a fractionally-spaced mode, and wherein further said timing recovery module comprises a phase interpolator, a phase detector, and a low pass filter.

8. The device of claim 1, wherein no low pass filter is coupled between said equalizer and said decimator.

9. A method of processing received signals of different data rates, said method comprising:
 receiving a first analog signal having a first data rate;
 converting said first analog signal to a first digital input signal by using a clock signal having a first rate during analog-to-digital conversion;
 performing equalization on said first digital input signal to generate a first equalized signal;
 decimating said first equalized signal by M to generate a decimated signal, wherein M is an integer greater than 1;
 filtering the decimated signal based on coefficients stored in a lookup table; and
 performing timing recovery on said decimated signal to obtain said clock signal having said first rate.

10. The method of claim 9, wherein said timing recovery is performed in 1/M of a full operation rate of a timing recovery module responsive to said first analog signal.

11. The method of claim 9, wherein said equalization is performed in a full operation rate of an equalizer responsive to said first analog signal.

12. The method of claim 11 further comprising: receiving a second analog signal that is transmitted in a second data rate that is M times of said first data rate; converting said second analog signal to a second digital input signal by using said clock signal having said first rate during analog-to-digital conversion; performing equalization in said first full operation rate of said equalizer on said second digital input signal to generate a second equalized signal; performing timing recovery on said second equalized signal without decimating to obtain said clock signal having said first rate.

13. The method of claim 9, wherein said first equalized signal propagates from an equalizer to a decimator without passing through a low pass filter in between said equalizer and said decimator.

14. A receiver operable to process received signals of different data rates, said receiver comprising:
 an analog-to-digital converter (ADC) configured to:
  convert a first analog signal having a first data rate to a first digital input signal by using a first rate for sampling; and
  convert a second analog signal having a second data rate to a second digital input signal by using said first rate for sampling, wherein said second data rate is M times of said first data rate, wherein M is an integer greater than 1;
 an equalizer coupled to an output of said ADC and configured to:
  perform equalization on said first digital input signal to generate a first equalized signal by using a full operation rate of said equalizer; and
  perform equalization on said second digital input signal to generate a second equalized signal by using said full operation rate of said equalizer;
 a decimator coupled to an output of said equalizer;
 a timing recovery module coupled to an output of said decimator; and
 a fast equalization module configured to remove jitter at frequencies above the timing recovery bandwidth.

15. The receiver of claim 14, wherein said decimator is configured to:
 decimate said first equalized signal by M; and send a decimated signal to said timing recovery module, and wherein further said decimator is configured to be by-passed responsive to said second equalized signal.

16. The receiver of claim 14 further comprising a slicer coupled to said output of said decimator and configured to: operate in 1/M of a full operation rate of said slicer responsive to said first analog signal; and operate in said full operation rate of said slicer responsive to said second analog signal.

17. The receiver of claim 14 further comprising a phase interpolator coupled between said timing recovery module and said ADC, wherein said phase interpolator is configured to generate a clock signal for supply to said ADC in a same rate responsive to said first analog signal and to said second analog signal.

18. The receiver of claim 14, wherein said timing recovery module is configured to: perform timing recovery in a 1/M of a full operation rate of said timing recovery module responsive to said first analog signal; and perform timing recovery in said full operation rate of said timing recovery module responsive to said second analog signal.

19. The receiver of claim 14, wherein said equalizer comprises a feed-forward equalizer (FFE) operable to operate in a fractionally-spaced mode.

20. The receiver of claim 14, wherein no low pass filter is coupled between said equalizer and said decimator.

* * * * *